United States Patent [19]

Funada et al.

[11] 4,337,999

[45] Jul. 6, 1982

[54] FLUORESCENT LIQUID CRYSTAL DISPLAY COMPOSITIONS AND DEVICES

[75] Inventors: Fumiaki Funada, Yamatokooriyama; Masataka Matsuura, Tenri; Tomio Wada, Nara, all of Japan

[73] Assignee: Sharp Corporation, Osaka, Japan

[21] Appl. No.: 934,349

[22] Filed: Aug. 17, 1978

[30] Foreign Application Priority Data

Aug. 29, 1977 [JP] Japan ............................. 52-104040
May 19, 1978 [JP] Japan ............................. 53-60358
Jun. 23, 1978 [JP] Japan ............................. 53-76743

[51] Int. Cl.$^3$ .......................... G02F 1/13; C09K 3/34
[52] U.S. Cl. ................................. 350/345; 350/349; 350/350 R; 252/299.1; 252/299.63
[58] Field of Search ................. 252/299, 408, 299.1, 252/299.63, 299.67; 350/350, 349, 345, 346

[56] References Cited

U.S. PATENT DOCUMENTS

| | | | |
|---|---|---|---|
| 3,844,637 | 10/1974 | Masi ................................. | 252/408 |
| 3,923,857 | 12/1975 | Boller et al. ..................... | 252/299 |
| 3,960,753 | 6/1976 | Larrabee ........................... | 252/299 |
| 3,981,817 | 9/1976 | Boller et al. .................... | 252/299 |
| 4,002,670 | 1/1977 | Steinstrasser ................... | 252/299 |
| 4,130,502 | 12/1978 | Eidenschink et al. ............ | 252/299 |
| 4,154,697 | 5/1979 | Eidenschink et al. ............ | 252/299 |
| 4,176,918 | 12/1979 | Labes ............................... | 252/299 |
| 4,181,625 | 1/1980 | Eidenschink et al. ............ | 252/299 |
| 4,198,130 | 4/1980 | Boller et al. .................... | 252/299 |
| 4,208,106 | 6/1980 | Oh ..................................... | 252/299 |

FOREIGN PATENT DOCUMENTS

| | | | |
|---|---|---|---|
| 2627215 | 1/1977 | Fed. Rep. of Germany ...... | 252/299 |
| 2702598 | 7/1978 | Fed. Rep. of Germany ...... | 252/299 |
| 2747113 | 4/1979 | Fed. Rep. of Germany ...... | 252/299 |
| 2842320 | 4/1979 | Fed. Rep. of Germany ...... | 252/299 |
| 2802588 | 6/1979 | Fed. Rep. of Germany ...... | 252/299 |
| 2854310 | 6/1979 | Fed. Rep. of Germany ...... | 252/299 |
| 105701 | 5/1974 | German Democratic Rep. ..................................... | 252/299 |
| 2017742 | 10/1979 | United Kingdom ............... | 252/299 |

OTHER PUBLICATIONS

Larrabee, R., RCA Rev., vol. 34, pp. 329–335 (1973).
Baur, G., et al., Mol. Cryst. Liq. Cryst., vol. 22, pp. 261–269 (1973).
Baur, G. et al., J. Appl. Phys., vol. 44, No. 4, pp. 1905–1906 (1970).
Steinstrasser, R., Angew. Chem. Int. Edit., vol. 11, No. 7, pp. 633–634 (1972).

*Primary Examiner*—Teddy S. Gron
*Attorney, Agent, or Firm*—Hubbell, Cohen, Stiefel & Gross

[57] ABSTRACT

A fluorescent liquid crystal display composition comprising a liquid crystal material absorbing little or no near ultraviolet light and a fluorescent material capable of emitting visible fluorescence, and a fluorescent liquid crystal display device comprising two parallel plates with the composition placed therebetween, at least one pair of electrodes and a voltage source for applying voltage to the composition to provide a self-luminescent brilliant active display with low power consumption by varying the luminescence efficiency of the fluorescent material.

12 Claims, 10 Drawing Figures

FLUORESCENT LIQUID CRYSTAL DISPLAY COMPOSITIONS AND DEVICES

BACKGROUND OF THE INVENTION

This invention relates to devices for giving displays by varying the luminescence efficiency of fluoroescent materials utilizing the electric field effect of changing the molecular orientation of liquid crystals and provides novel and useful compositions relating to liquid crystal materials therefor. Generally known as electro-optical effects of liquid crystals are dynamic scattering effect, twisted nematic electric field effect, guest-host effect, cholesteric-nematic phase transition effect, etc. These electro-optical effects provide displays by the scattering or absorption of ambient light, as distinct from the effects of luminescent materials which per se product luminescent displays such as lamp displays, light emitting diode displays, electroluminescence displays, plasma displays or the like. The displays resorting to the electro-optical effects are advantageous over those of the latter type in that they involve reduced energy consumption but have the drawback of lacking brilliance.

The present invention has overcome the above problem and provides novel useful display devices and compositions therefor which have the low power consumption characteristics of so-called passive displays not luminescent in themselves and which incorporate a self-luminescent component for giving a brilliant active display.

R. D. Larrabee has already proposed to add a fluorescent material to a liquid crystal material and vary the fluorescent intensity of the material by electric field (RCA Review, Vol. 34, p 329, 1973). However, his paper states that he failed to find liquid crystal materials which do not absorb ultraviolet light at room temperature. This appears attributable to the fact that when causing a fluorescent material in a liquid crystal material to absorb a varying amount of light in accordance with the orientation of the liquid crystal to vary the fluorescence intensity with the light absorption, the exciting light is absorbed by the liquid crystal layer without effectively exciting the fluorescent material. U.S. Pat. No. 3,960,753 further discloses fluorescent liquid crystal compositions comprising 4'-alkyloxy- (or -acyloxy-)benzylidene-4-cyanoaniline as a liquid crystal material, but the operating temperature of the liquid crystal material is considerably higher than room temperature. U.S. Pat. No. 3,844,637 similarly discloses fluorescent liquid crystal compositions comprising 4'-methoxy- (or -ethoxy-)benzylidene-4-n-butylaniline as a liquid crystal material. However, the compositions per se absorb violet light or near ultraviolet light without permitting effective excitation of the fluorescent material.

This invention provides novel luminescent display devices of the low power consumption type with use of liquid crystal materials which form a nematic, smectic or cholesteric phase at room temperature and which are usable in display devices for electronic apparatus or the like and entirely different from those of the foregoing references, the liquid crystal materials permitting effective excitation of fluorescent materials.

SUMMARY OF THE INVENTION

The fluorescent liquid crystal display compositions of this invention comprises a liquid crystal material and a fluorescent material capable of emitting visible fluorescence, the liquid crystal material consisting essentially of at least one of the compounds represented by the formula (I)

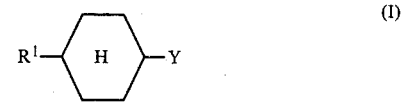

wherein $R^1$ is alkyl having 3 to 9 carbon atoms, and Y is a group of the formula

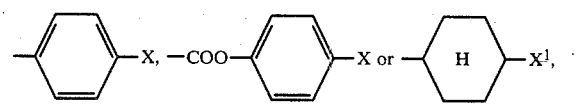

X being cyano, alkyl having 3 to 9 carbon atoms, alkoxy having 3 to 9 carbon atoms or alkylcarbonyloxy having 4 to 10 carbon atoms, $X^1$ being cyano, and compounds represented by the formula (II)

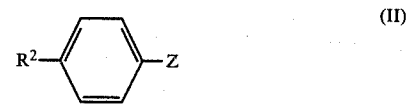

wherein $R^2$ is alkyl having 1 to 8 carbon atoms or alkylcarbonyloxy having 2 to 9 carbon atoms, and Z is a group of the formula

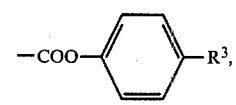

$R^3$ being cyano or alkoxy having 1 to 8 carbon atoms. The compositions contain at least one of the compounds of the formulae (I) and (II) preferably in an amount of at least 70% by weight. The invention also provides fluorescent liquid crystal display devices comprising two parallel plates having the composition placed therebetween, at least one pair of electrodes and voltage applying means.

DESCRIPTION OF THE PREFERRED EMBODIMENTS

Given below are examples of typical compounds of the formulae (I) and (II) of this invention. $T_{CN}$ is the transition temperature at which the crystal changes to a nematic phase, and $T_{NI}$ is the transition temperature at which the nematic phase changes to an isotropic phase.

| | $T_{CN}$ (°C.) | $T_{NI}$ (°C.) |
|---|---|---|
| 4'-n-Propylcyclohexyl-4-cyanobenzene | 42 | 45 |
| 4'-n-Pentylcyclohexyl-4-cyanobenzene | 30 | 55 |
| 4'-n-Heptylcyclohexyl-4-cyanobenzene | 30 | 57 |
| 4'-Cyanophenyl-4-n-pentylhexahydrobenzoate | 30 | 87 |
| 4'-Pentoxyphenyl-4-n-pentylhexahydrobenzoate | 28 | 70 |
| 4-Cyano-4'-n-propyl-bicyclohexyl | 58 | 80 |
| 4-Cyano-4'-n-pentyl-bicyclohexyl | 62 | 85 |
| 4-Cyano-4'-n-heptyl-bicyclohexyl | 71 | 83 |
| 4'-Cyanophenyl-4-n-butylbenzoate | 66.5 | 42 |

-continued

| | $T_{CN}$ (°C.) | $T_{NI}$ (°C.) |
|---|---|---|
| | | (monotropic) |
| 4'-Cyanophenyl-4-n-hexylbenzoate | 44.5 | 47.5 |
| 4'-Cyanophenyl-4-n-octylbenzoate | 46.5 | 54 |
| 4'-Buthoxyphenyl-4-n-pentylbenzoate | 49 | 58 |
| 4'-Methoxyphenyl-4-n-butylcarbonyloxybenzoate | 86 | 91 |

It is preferable that the liquid crystal materials of this invention comprise a mixture of at least two compounds rather than a single compound. Thus a preferred combination of compounds of the formulae (I) and (II) is a mixture of at least two compounds represented by the formula (III)

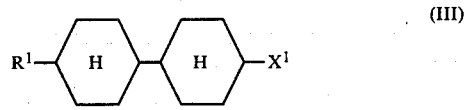
(III)

wherein $R^1$ and $X^1$ are as defined in the formula (I). Another preferred combination is a mixture of at least one compound of the formula (III) and at least one compound of the formula (IV)

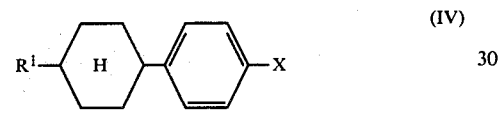
(IV)

wherein $R^1$ and X are as defined in the formula (I). Another preferred combination is a mixture of at least one compound of the formula (III) and at least one compound of the formula (V)

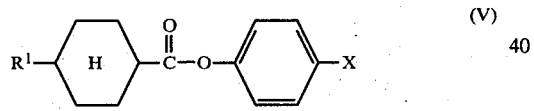
(V)

wherein $R^1$ and X are as defined in the formula (I). Another preferred combination is a mixture of at least one compound of the formula (III), at least one of compounds of the formula (IV) and/or formula (V), and at least one compound of the formula (II).

We have found that the most preferable liquid crystal materials are mixtures containing at least one compound of the formula (III). Another preferred combination is a mixture of compounds of the formula (I).

Examples of more specific liquid crystal mixtures are a mixture of 4-cyano-4'-n-propyl-bicyclohexyl, 4-cyano-4'-n-pentyl-bicyclohexyl and 4-cyano-4'-n-heptyl-bicyclohexyl (product of Merck & Co., Inc., ZLI-1167 type liquid crystal, $T_{CS}=8°$ C., $T_{SN}=32°$ C., $T_{NI}=83°$ C., $\eta(20°$ C.)=25 c.p., $\epsilon_{\parallel}-\epsilon_{\perp}=3.0$, where $T_{CS}$ is the transition temperature at which the crystal changes to a smectic phase, $T_{SN}$ is the transition temperature at which the smectic phase changes to a nematic phase, $\eta(20°$ C.) is the viscosity at 20° C., $\epsilon_{\parallel}$ is the specific inductive capacity in the direction of the long axis, and $\epsilon_{\perp}$ is the specific inductive capacity in the direction of the short axis); a mixture of 4'-n-propylcyclohexyl-4-cyanobenzene, 4'-n-pentylcyclohexyl-4-cyanobenzene and 4'-n-heptylcyclohexyl-4-cyanobenzene (product of Merck & Co., Inc., ZLI-1083 type liquid crystal, $T_{CN}=-3°$ C., $T_{NI}=51°$ C., $\eta(20°$ C.)=21.0 c.p., $\epsilon_{\parallel}=15.2$, $\epsilon_{\perp}=5.1$); a mixture of 4'-cyanophenyl-4-n-butylbenzoate, 4'-cyanophenyl-4-n-hexylbenzoate and 4'-cyanophenyl-4-n-octylbenzoate (product of H. L. Roche Inc., liquid crystal ROTN 103, $T_{CN}=6.5°$ C., $T_{NI}=47°$ C., $\epsilon_{\parallel}=34$, $\epsilon_{\perp}=8.6$); etc.

The liquid crystal materials of this invention comprising the foregoing compounds as main components may further incorporate compounds of the following formulae in an amount of up to 30% by weight of the whole liquid crystal material.

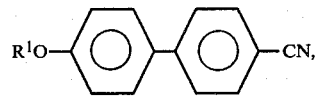

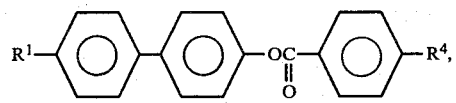

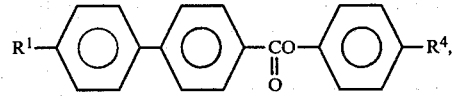

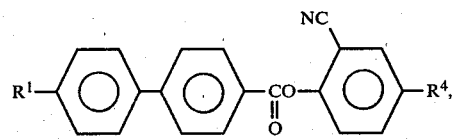

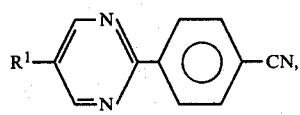

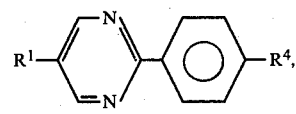

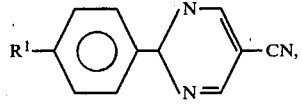

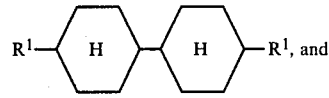

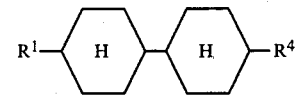

wherein $R^1$ is as defined in the formula (I), and $R^4$ is alkoxy having 1 to 8 carbon atoms.

Examples of fluorescent materials useful in this invention are usually aromatic compounds such as anthracene, tetracene, pyrene, Pyronin G, Pyronin B, Rhodamine 6G, perchlorate, cryptocyanine, Coumarin 6, Coumarin 7, Fluorescein, 9,10-dimethylanthracene, 9,10-diphenylanthracene, perylene, fluorine, p-quaterphenyl, rubrene, terphenyl, 2,5-diphenylfuran, 2,5-diphenyloxyazole, 2-phenyl-5-(4-biphenylyl-1,3,4-oxadiazole, 1,4-bis[2-(5-phenyloxazolyl)]benzene, Samaron Brilliant Yellow H6GL, Brilliant Phosphine, Primulin 0, 1,8-diphenyl-1,3,5,7-octatetracene, Acridine Yellow, Thioflavine S, Pyronin GS, 1,12-benzperylene, etc. Useful materials are not limited to these examples. Among these examples, Coumarin 7 and Samaron Brilliant Yellow H6GL are preferred. The fluorescent material is used in an amount of about 0.005 to about 1.0% by weight, preferably 0.01 to 0.5% by weight, of the liquid crystal material. The liquid crystal compositions of this invention have the feature of emitting fluorescence at room temperature. The compositions are prepared in the usual manner. The fluorescent material is contained in the composition preferably as dissolved in the liquid crystal material.

The accompanying drawings will be described below briefly.

Figure 1:
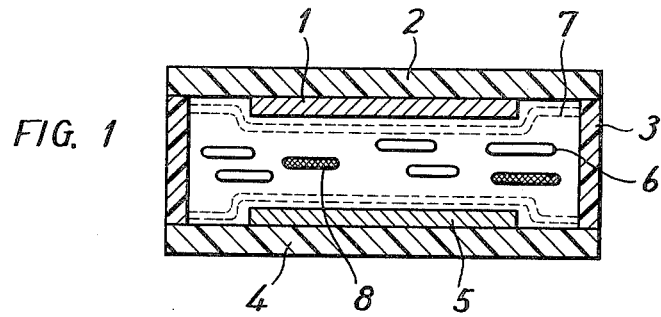
FIG. 1 is a schematic diagram showing the construction of a display device embodying this invention.
Figure 7:
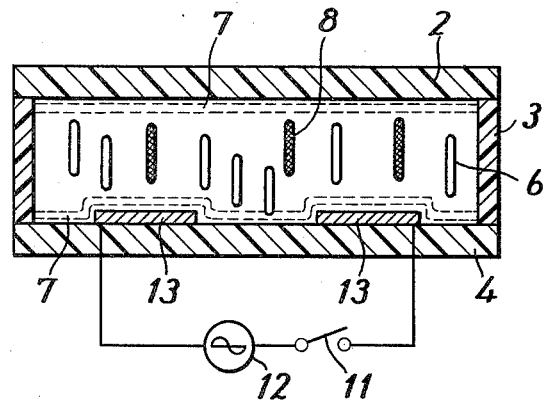
Figure 8:
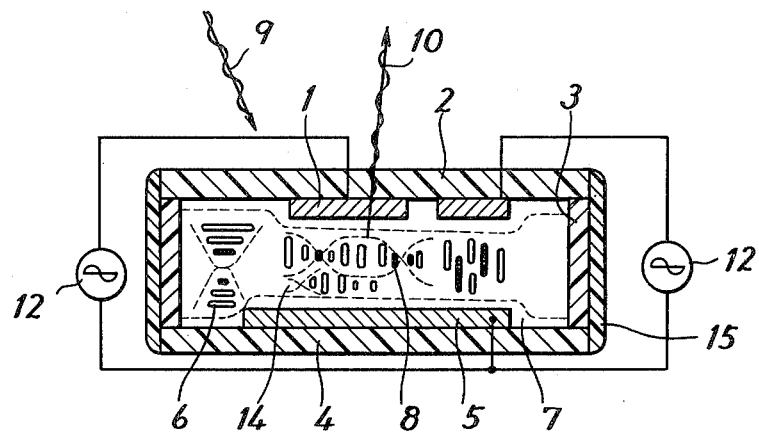
Figure 9:
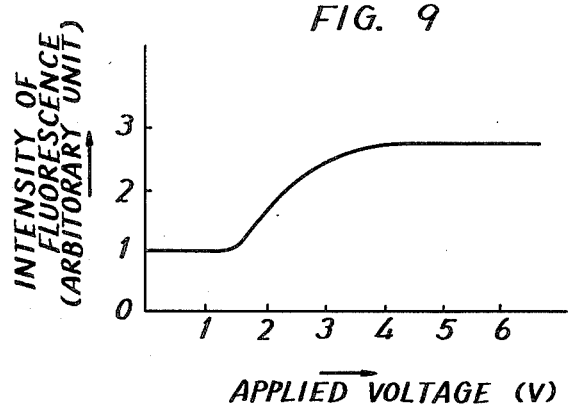
Figure 10:
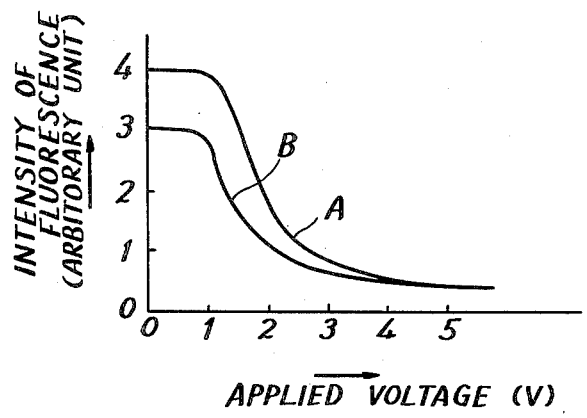

FIGS. 7 and 8 are diagrams showing other display devices embodying this invention; and FIGS. 9 and 10 are diagrams showing the contrast characteristics of the display devices of FIGS. 7 and 1 including liquid crystal materials of this invention, respectively.

The display devices embodying this invention and the principle of the operation thereof will be described below in detail with reference to the drawings.

The display devices substantially comprise at least one pair of electrodes, voltage applying means, two parallel plates having a fluoroscent liquid crystal composition placed therebetween. The device shown in FIG. 1 comprises a display electrode 1 made of a transparent material such as $In_2O_3$, $SnO_2$, $TiO_2$ or the like and adhered to the inner surface of a transparent base plate 2 of glass, quartz, acrylic resin, polyethylene or the like. The transparent base plate 2 is provided with a side wall 3 made of epoxy resin, silicone resin, first glass, polymer or like sheet to form a container. Opposed to the transparent base plate 2 is a rear base plate 4 made of transparent material or reflective material. In opposed relation to the display electrode 1, the rear base plate 4 is provided with a rear electrode 5 adhered to the inner surface of the base plate 4 and made of reflective material such as Al, Au, Cr, Ag or the like or transparent material such as $In_2O_3$, $SnO_2$, $TiO_2$ or the like. At least one of the rear base plate 4 or rear electrode 5 may be made of reflective material. The container is filled with a liquid crystal material 6 in the form of a nematic phase, smectic phase or cholesteric phase. The display electrode 1 and rear electrode 5 in contact with the liquid crystal material 6 are covered with a liquid crystal molecule orientation layer 7 such as a rubbed layer 7 of SiO, $SiO_2$ or the like, a layer of SiO, $SiO_2$ or the like formed by the angular deposition, or a layer of surfactant having long-chain alkyl or long-chain fluoroalkyl or containing a silane compound having amino. The liquid crystal material 6 contains a dichroic absorbing fluorescent material.

With reference to FIGS. 2 to 6, the principle of operation of the display device shown in FIG. 1 will now be described.

Figure 4:
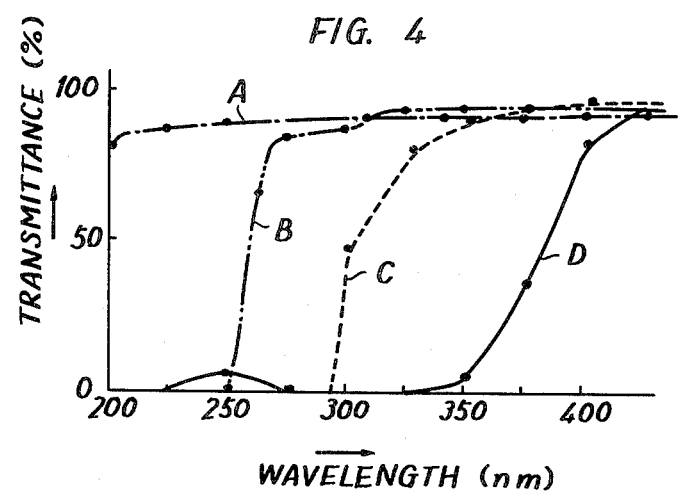
FIG. 4 is a graph showing the transmission of three kinds of liquid crystal materials used for embodying this invention and of 4'-methoxy-benzylidene-4-n-butylaniline (MBBA) which is a liquid crystal material conventionally used.

The liquid crystal material 6 is in the form of a nematic phase or cholesteric phase having a great dielectric constant in the direction of the long axis and a positive dielectric anisotropy. FIG. 4 shows the wavelength dependence of the transmission of liquid crystal mixtures of the ZLI-1167 type, ZLI-1083 type (both products of Merck) and ROTN 103 type (product of Roche) already described and of MBBA, a liquid crystal material generally used, as indicated at A, B, C and D respectively. The liquid crystal materials were used in the form of a 10-μm-thick layer. It is seen that the liquid crystal materials of this invention (A, B and C in FIG. 4) greatly absorb light at wavelengths shorter than about 200 to about 290 nm with little or no rear ultraviolet absorption and are therefore desirable as solvents for fluorescent materials. However, MBBA (D in FIG. 4) absorbs light at wavelengths shorter than 350 nm and is not effective in exciting fluorescent materials.

Figure 5:
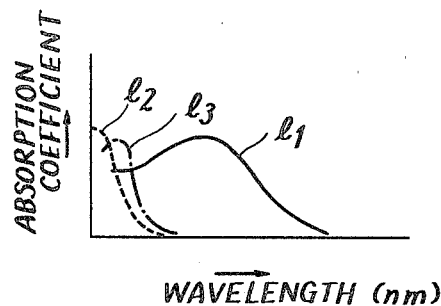
FIG. 5 is a graph showing the absorption spectrum of a fluorescent material used in this invention.

Absorption spectra of fluorescent materials are generally anisotropic, and the absorption in the direction of the long axis often takes place at longer wavelengths than the absorption in the direction of the short axis as illustrated in FIG. 5 in which indicated at $l_1$ is the absorption spectrum of a fluorescent material in the direction of the long axis, at $l_2$ that in the direction of the short axis and at $l_3$ the absorption spectrum of a liquid crystal material in the direction of the long axis. The wavelength is plotted as abscissa vs. the absorbance as ordinate.

Figure 2:
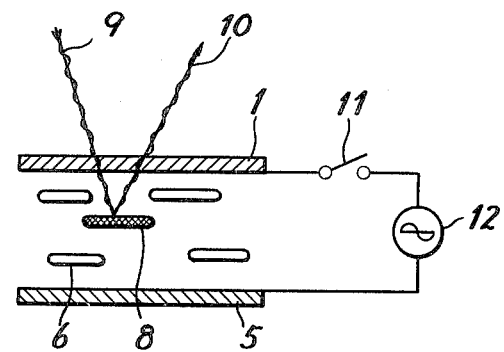
FIGS. 2 and 3 are diagrams showing the principle of operation of the display device of FIG. 1.
Figure 3:
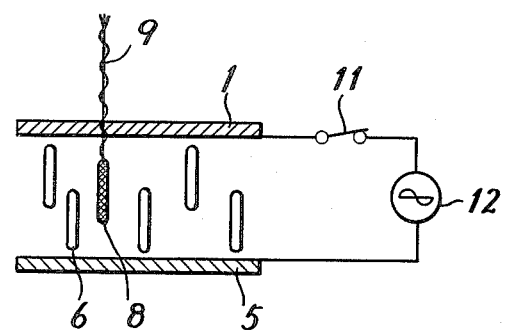
Figure 6:
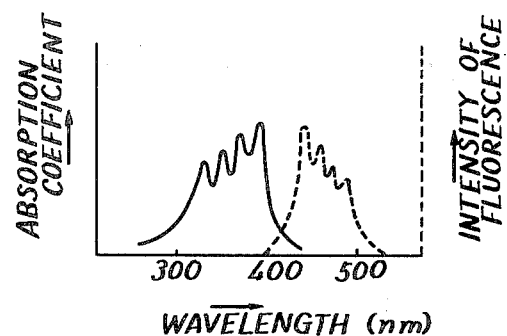
FIG. 6 is a graph showing the fluorescence spectrum and absorption spectrum of anthracene.

Incident exciting light having a wavelength $\lambda_1$ at which the absorbance of $l_1$ is substantially the highest is applied to the display device shown in FIG. 1. When the direction of electric field vibration of the incident light 9 is parallel to the long axis of the fluorescent material as shown in FIG. 2, the material absorbs the exciting light 9 according to the absorption spectrum $l_1$ of FIG. 5, emitting fluorescence 10, whereas if is is in parallel to the short axis as seen in FIG. 3, the material does not absorb the exciting light 9 of wavelength $\lambda_1$ according to the absorption spectrum $l_2$ of FIG. 5 and does not emit fluorescence. These two optical modes are utilized in the display device of this invention. Thus the display electrode 1 and rear electrode 5 are connected to an a.c. power supply 12 via a switch 11 to apply voltage to the liquid crystal composition in the container across the electrodes 1 and 5 for the control of the two optical modes. With application of voltage, the liquid crystal material is oriented as shown in FIG. 3, while when the device is de-energized, the material restores the orientation of FIG. 2. Since the fluorescence spectrum and absorption spectrum exhibit mirror symmetrical characteristics, the fluorescence of desired color can be obtained with use of a fluorescent material having an absorption spectrum corresponding to the desired fluorescent color. The fluorescence spectrum and absorption spectrum of anthracene are shown in FIG. 6 in which the wavelength is plotted as abscissa vs. the absorptivity and fluorescence intensity as ordinate. The absorption spectrum is indicated in the solid line, and the fluorescence spectrum in the broken line.

The device of FIGS. 2 and 3 incorporates a liquid crystal material having a positive dielectric anisotropy to utilize horizontal orientation (homogeneous orientation in the case of the nematic phase, or Grandjean orientation with the cholesteric phase) as the initial orientation. Alternatively this invention can be embodied with use of liquid crystal materials having a negative dielectric anisotropy utilizing vertical orientation (homeotropic orientation) as the initial orientation. With liquid crystal materials having a cholesteric phase, focal conic orientation can be utilized. In this case, an optically active substance is added to the liquid crystal materials. Thus liquid crystal compounds of the formula (I) or (II) are usable in which the substituent $R^1$ or $R^2$ has an asymmetric carbon atom. Other usual liquid crystal materials are similarly useful when containing an asymmetric carbon atom in the substituent thereof.

While the display device of FIG. 1 has an electrode arrangement of the sandwich type, the display device shown in FIG. 7 includes an electrode arrangement of the interdigital type. In these drawings, like parts are referred to by like reference numerals.

A transparent base plate 2, side wall 3 and rear base plate 4 provide a container filled with a liquid crystal material 6 and fluorescent material 8. A pair of electrodes 13 attached to the inner surface of the rear base plate 4 is connected to an a.c. powder supply 12 through a switch 11. When the liquid crystal material has a positive dielectric anisotropy, vertical orientation is utilized as the initial orientation, while if it has a negative dielectric anisotropy, horizontal orientation is utilized. When a liquid crystal material is used whose dielectric anisotropy is changeable with frequency instead of using the switch 11, the orientation can be switched with the variation of frequency. This is also useful for the sandwich-type electrode arrangement.

Although the foregoing devices utilize the electric field effect due to the dielectric anisotropy to change the orientation of the fluorescent material 8, the orientation is changeable also by utilizing the anistropy of conductivity. This requires the use of a frequency f such that $f < \sigma_\parallel / \epsilon_\parallel \epsilon_0$ wherein $\sigma_\parallel$ is the conductivity in the direction of the long axis of the liquid crystal molecules, $\epsilon_\parallel$ is relative dielectric constant in the same direction and $\epsilon_0$ is dielectric constant of vacuum.

Whereas the fluorescence intensity is variable by changing the orientation of the liquid crystal molecules according to the embodiments described above, the present invention can be embodied with a scattering center formed in the liquid crystal layer for varying the intensity of fluorescence from the liquid crystal layer with variations in the density of the scattering center. FIG. 8 shows an embodiment thus adapted and having a scattering center 14 and a side plate 15 having an inner surface of specular finish. Throughout FIGS. 1 to 3 and FIG. 8, like parts are referred to by like reference numerals. The device utilizes the aforesaid advantage of the liquid crystal material of this invention that it involves very low near ultraviolet absorption, permitting effective excitation of the fluorescent material and another advantage that aromatic ester compounds have relatively great birefringence.

With the liquid crystal ROTN 103 mentioned before, the difference between the index of refraction of extraordinary light and that for ordinary light ($n_e - e_o = \Delta n$) at 633 nm is about 0.22, whereas 4'-n-propyl-cyclohexyl-4-cyanobenzene has a corresponding value of about 0.13. Thus the aromatic ester is more efficient in scattering light when the scattering center 14 is formed.

The scattering center 14 may be provided by the dynamic flow of nematic liquid crystals exhibiting a dynamic scattering phenomenon, or by the orientation of the focal conic structure of cholesteric liquid crystals, or by local disturbance or disclination in the orientation of a nematic, cholesteric or smectic liquid crystal layer produced as by thermal stimulation.

An example is given below in which a device as shown in FIG. 8 was prepared with the use of a liquid crystal material comprising a liquid crystal mixture of the aforesaid ZLI-1167 type and 10% by weight of an optically active substance of the formula

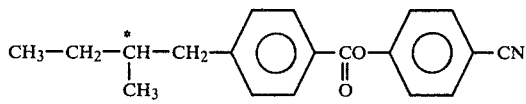

or a liquid crystal mixture, ROTN 103, and 10% by weight of an optically active substance, CB-15 (product of BDH Chemicals Ltd.).

As the initial orientation of the liquid crystal molecules, the Grandjean structure of cholesteric phase was used which was changeable to a focal conic structure or homeotropic state of nematic phase by varying the voltage applied to the liquid crystal layer to control the scattering effect and to thereby vary the fluorescence emitted from the display device. The display contrast was produced with use of 0.5% by weight of Coumarin 7 as the fluorescent material 8. A 1-mm-thick Pyrex glass sheet was used for the glass base plates 2 and 4, $In_2O_3$ for the display electrode 1, Al for rear electrode 5 and a coating of Acid-T (product of Merck Co., Inc.) on $SiO_2$ for the liquid crystal molecule orientation layer 7. The two liquid crystal mixtures were tested to give a value of 10:1 in contrast ratio.

The characteristics of devices of this invention will be described below. FIG. 9 shows the contrast characteristics of a display device as shown in FIG. 7 and incorporating a liquid crystal mixture, ZLI-1083. FIG. 10 shows the contrast characteristics of display devices of the construction of FIG. 1 prepared with use of liquid crystal mixtures ZLI-1167 and ROTN 103. In these drawings, the effective value of a.c. voltage applied is plotted as abscissa vs. the intensity of fluorescence as ordinate.

Test results are given below.

1. A liquid crystal mixture, ZLI-1083 (FIG. 9), was used with 0.02% by weight of a fluorescent material, Samaron Brilliant Yellow H6GL, added to the mixture. The liquid crystal mixture had a thickness of 10 μm and a temperature of 25° C. A high-pressure mercury lamp was used for excitation. The device was tested for response characteristics at 5 volts at wavelength of 590 nm, with the result that the rise time was 50 m. sec. and decay time was 60 m. sec.

2. A liquid crystal mixture, ZLI-1167 (FIG. 10, A) was used with 0.5% by weight of a fluorescent material, Coumarin 7 (product of Eastman Kodak Co.), added to the mixture. The liquid crystal mixture had a thickness of 10 μm and a temperature of 25° C. A high-pressure mercury lamp was used for excitation. The device was tested for response characteristics at 5 volts at wavelength of 590 nm, with the result that the rise time was 50 m. sec. and decay time was 200 m. sec.

3. A liquid crystal mixture, ROTN 103 (FIG. 10, B), was used with 0.5% by weight of a fluorescent material, Coumarin 7 (Eastman Kodak Co.), added to the mixture. The liquid crystal mixture had a thickness of 10 μm and a temperature of 25° C. A high-pressure mercury lamp was used for excitation. The device was tested for response characteristics at 5 volts at wavelength of 590 nm, with the result that the rise time was 50 m. sec. and decay time was 200 m. sec.

Thus the present invention provides novel display devices which have the low power consumption characteristics of passive displays and which incorporate a self-luminescent component for giving an active display of outstanding characteristics. The devices are therefore useful for producing displays on a wide variety of apparatus such as portable or desk-model calculators, table clocks, wrist watches, meters, thermometers, etc.

Although this invention has been described above as embodied in the form of display devices of the reflecting type, the invention can be embodied as those of the permeable type in which the electrodes and base plates are all transparent and which may be advantageously used in combination with an exciting light source.

What is claimed is:

1. A fluorescent liquid crystal composition comprising a liquid crystal material and a coumarin fluorescent dye capable of emitting visible fluorescence and soluble in said liquid crystal material, said liquid crystal material comprising as the main component a mixture of liquid crystal compounds comprising at least one compound of the formula (I)

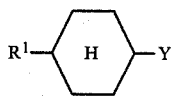

wherein $R^1$ is alkyl having 3 to 9 carbon atoms, and Y is a group of the formula

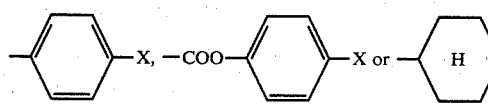

X being cyano, alkyl having 3 to 9 carbon atoms, alkoxy having 3 to 9 carbon atoms or alkylcarbonyloxy having 4 to 10 carbon atoms, $X^1$ being cyano, and at least one compound of the formula (II)

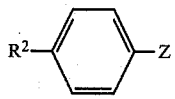

wherein $R^2$ is alkyl having 1 to 8 carbon atoms or alkylcarbonyloxy having 2 to 9 carbon atoms, and Z is a group of the formula

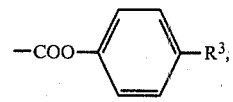

$R^3$ being cyano or alkoxy having 1 to 8 carbon atoms.

2. A fluorescent liquid crystal composition comprising a liquid crystal material and a coumarin fluorescent dye capable of emitting fluorescence and soluble in said liquid crystal material, said liquid crystal material comprising at least one compound of the formula (I)

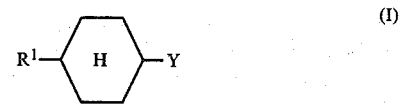

wherein $R^1$ is alkyl having 3 to 9 carbon atoms, and Y is a group of the formula

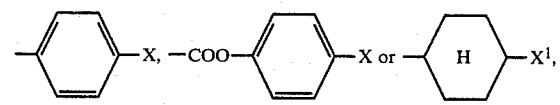

X being cyano, alkyl having 3 to 9 carbon atoms, alkoxy having 3 to 9 carbon atoms or alkylcarbonyloxy having 4 to 10 carbon atoms, $X^1$ being cyano.

3. A fluorescent liquid crystal display device substantially comprising at least one pair of electrodes, voltage applying means and two parallel plates having a fluorescent liquid crystal composition placed therebetween, the composition comprising a liquid crystal material and a coumarin fluorescent dye capable of emitting visible fluorescence and soluble in said liquid crystal material, said liquid crystal material comprising as the main component a mixture of liquid crystal compounds comprising at least one compound of the formula (I)

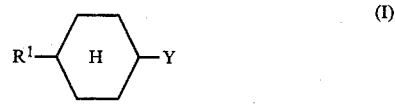

wherein $R^1$ is alkyl having 3 to 9 carbon atoms, and Y is a group of the formula

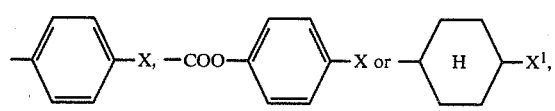

X being cyano, alkyl having 3 to 9 carbon atoms, alkoxy having 3 to 9 carbon atoms or alkylcarbonyloxy having 4 to 10 carbon atoms, $X^1$ being cyano, and at least one compound of the formula (II)

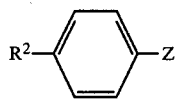

wherein R² is aklyl having 1 to 8 carbon atoms or alkylcarbonyloxy having 2 to 9 carbon atoms, and Z is a group of the formula

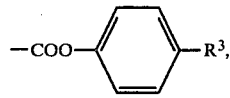

R3 being cyano or alkoxy having 1 to 8 carbon atoms.

4. A fluorescent liquid crystal display device substantially comprising at least one pair electrodes, voltage applying means and two parallel plates having a fluorescent liquid crystal composition placed therebetween, the composition comprising a liquid crystal material and a coumarin fluorescent dye capable of emitting fluorescence and soluble in said liquid crystal material, said liquid crystal material comprising at least one compound of the formula (I)

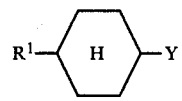

wherein R¹ is alkyl having 3 to 9 carbon atoms, and Y is a group of the formula

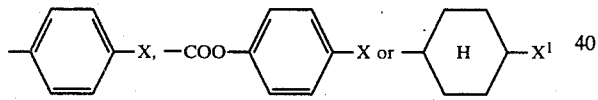

X being cyano, alkyl having 3 to 9 carbon atoms, alkoxy having 3 to 9 carbon atoms or alkylcarbonyloxy having 4 to 10 carbon atoms, X¹ being cyano.

5. A composition as defined in either of claims 1 or 2 wherein the main component of the liquid crystal material is contained in an amount of at least about 70% by weight of the composition.

6. A composition as defined in either or claims 1 or 2 wherein the coumarin fluorescent dye is contained in an amount of about 0.005 to about 1.0% by weight of the composition.

7. A composition as defined in claim 2 wherein the liquid crystal material is a mixture of at least two compounds represented by the formula (III)

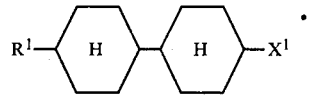

wherein R¹ and X¹ are as defined in the formula (I).

8. A composition as defined in claim 2 wherein the liquid crystal material is a mixture of at least one compound of the formula (III)

wherein R¹ and X¹ are as defined in the formula (I), and at least one compound of the formula (IV)

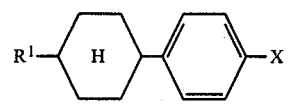

wherein R¹ and X are as defined in the formula (I).

9. A composition as defined in claim 2 wherein the liquid crystal material is a mixture of at least one compound of the formula (III)

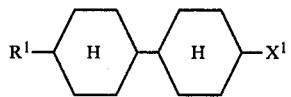

wherein R¹ and X¹ are as defined in the formula (I), and at least one compound of the formula (V)

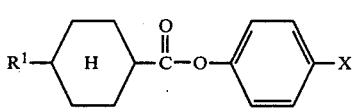

wherein R¹ and X are as defined in the formula (I).

10. A composition as defined in claim 2 wherein the liquid crystal material is a mixture of 4-cyano-4'-n-propyl-bicyclohexyl, 4-cyano-4'-n-pentyl-bicyclohexyl and 4-cyano-4'-n-heptylbicyclohexyl.

11. A composition as defined in claim 2 wherein the liquid crystal material is a mixture of 4'-n-propylcyclohexyl-4-cyanobenzene, 4'-n-pentylcyclohexyl-4-cyanobenzene and 4'-n-heptylcyclohexyl-4-cyanobenzene.

12. A composition as defined in either claim 1 or 2, wherein said coumarin fluorescent dye is selected from the group consisting of Coumarin 6 and Coumarin 7.

* * * * *